United States Patent
Li et al.

(10) Patent No.: US 11,710,969 B2
(45) Date of Patent: Jul. 25, 2023

(54) POWER OPTIMIZATION METHOD AND APPARATUS THEREFOR, AND PHOTOVOLTAIC DEVICE AND PHOTOVOLTAIC SYSTEM

(71) Applicant: GREE ELECTRIC APPLIANCES, INC. OF ZHUHAI, Guangdong (CN)

(72) Inventors: Meng Li, Guangdong (CN); Shiyong Jiang, Guangdong (CN); Meng Huang, Guangdong (CN); Xuefen Zhang, Guangdong (CN); Xiang Zhang, Guangdong (CN); Fulong Che, Guangdong (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 199 days.

(21) Appl. No.: 17/415,677

(22) PCT Filed: Jun. 24, 2019

(86) PCT No.: PCT/CN2019/092560
§ 371 (c)(1),
(2) Date: Feb. 18, 2022

(87) PCT Pub. No.: WO2020/124973
PCT Pub. Date: Jun. 25, 2020

(65) Prior Publication Data
US 2022/0190603 A1 Jun. 16, 2022

(30) Foreign Application Priority Data
Dec. 18, 2018 (CN) .......................... 201811548851.4

(51) Int. Cl.
*H02J 3/38* (2006.01)
*H02J 3/46* (2006.01)

(52) U.S. Cl.
CPC ................ *H02J 3/381* (2013.01); *H02J 3/46* (2013.01); *H02J 2300/26* (2020.01)

(58) Field of Classification Search
CPC ...... H02J 3/38; H02J 3/381; H02J 3/46; H02J 2300/26
See application file for complete search history.

(56) References Cited

FOREIGN PATENT DOCUMENTS

| CN | 104092240 A | 10/2014 |
|---|---|---|
| CN | 104113280 A | 10/2014 |

(Continued)

OTHER PUBLICATIONS

International Search Report in the international application No. PCT/CN2019/092560, dated Sep. 24, 2019 (with translation) (6 pages).

(Continued)

*Primary Examiner* — Robert L Deberadinis
(74) *Attorney, Agent, or Firm* — Perkins Coie LLP

(57) ABSTRACT

Disclosed are a power optimization method and an apparatus therefor, and a photovoltaic device and a photovoltaic system. The power optimization of a photovoltaic assembly can be realized when a series connection architecture or a parallel connection architecture is used for the photovoltaic assembly. The method includes: power optimization apparatuses carrying out MPPT processing on photovoltaic assemblies according to operating parameters of the photovoltaic assemblies corresponding to the power optimization apparatuses on a one-to-one basis (101); and controlling the photovoltaic assemblies according to MPPT processing results so that power states of the photovoltaic assemblies are optimized (102). By means of providing a power optimization apparatus for each photovoltaic assembly, the power optimization apparatus carries out MPPT processing (Continued)

on the corresponding photovoltaic assembly, thereby preventing the occurrence of power mismatch.

18 Claims, 4 Drawing Sheets

(56) References Cited

FOREIGN PATENT DOCUMENTS

| | | |
|---|---|---|
| CN | 104426473 A | 3/2015 |
| CN | 104579120 A | 4/2015 |
| CN | 106300612 A | 1/2017 |
| CN | 109634349 A | 4/2019 |
| JP | 2018165921 A | 10/2018 |
| KR | 20180104873 A | 9/2018 |

OTHER PUBLICATIONS

Written Opinion of the International Searching Authority, in the international application No. PCT/CN2019/092560, dated Sep. 16, 2019 (with translation) (7 pages).
CN Application 201811548851.4 Examiner Original Search Report, dated Jul. 23, 2019 (2 pages).
CN Application 201811548851.4 Examiner Supplemental Search Report, dated Mar. 2, 2020 (2 pages).
CN Application 201811548851.4 First Office Action, dated Aug. 1, 2019 (with translation) (20 pages).
CN Application 201811548851.4 Second Office Action, dated Sep. 27, 2019 (with translation) (22 pages).
CN Application 201811548851.4 Third Office Action, dated Mar. 9, 2020 (with translation) (19 pages).

POWER OPTIMIZATION METHOD AND APPARATUS THEREFOR, AND PHOTOVOLTAIC DEVICE AND PHOTOVOLTAIC SYSTEM

CROSS-REFERENCE TO RELATED APPLICATIONS

The present application is a U.S. National Phase Entry of International PCT Application No. PCT/CN2019/092560 filed on Jun. 24, 2019, and entitled "POWER OPTIMIZATION METHOD AND APPARATUS THEREFOR, AND PHOTOVOLTAIC DEVICE AND PHOTOVOLTAIC SYSTEM," which claims priority from CN application No. 201811548851.4, filed on Dec. 18, 2018, and titled "POWER OPTIMIZATION METHOD AND APPARATUS THEREFOR, AND PHOTOVOLTAIC DEVICE AND PHOTOVOLTAIC SYSTEM," the entire contents of which are incorporated herein by reference.

TECHNICAL FIELD

The disclosure relates to the field of photovoltaic control, and in particular to a power optimization method and a power optimization apparatus, a photovoltaic device and a photovoltaic system.

BACKGROUND

With the increasing global energy demand, photovoltaic power generation has received more and more attention due to its advantages of being clean, convenient, safe, and suitable for distributed networking, and the like, and has become one of the most promising renewable energy power generation methods.

The photovoltaic power generation system is sensitive to the change of an external environment and the consistency of assemblies, and when the system encounters the mismatch problem caused by local shadow shielding or individual difference of photovoltaic assemblies, an output power of the system is remarkably reduced. The problem becomes one of important factors restricting the further popularization and application of the photovoltaic power generation.

In a related photovoltaic power generation system, a photovoltaic group string is formed among individual assemblies in a series connection mode and then is connected to a photovoltaic DC (Direct Current), an inverter or an energy storage inverter system according to different requirements of the photovoltaic power and bus voltage. In order to maximize the utilization of the photovoltaic power generation energy, an MPPT (Maximum Power Point Tracking) algorithm is usually adopted to ensure that the photovoltaic string operates in a maximum power generation capacity state.

SUMMARY

The inventors found through research that the photovoltaic power generation system connected in series between the assemblies has large output power attenuation under a mismatch condition. The main reason has two aspects: firstly, an output characteristic curve has multiple peak values, the existing MPPT algorithm is interfered by a plurality of extreme points, and it is impossible to find a real maximum power point; secondly, due to characteristic mismatch, operating currents of the maximum power point of all parts of the system are different, and a power generation potential is wasted even if the system works at the maximum power point of a system characteristic curve.

The present disclosure provides a solution for ensuring that the photovoltaic assembly operates at maximum power generation capacity by optimizing the power state of the photovoltaic assembly.

According to a first aspect of the embodiments of the present disclosure, there is provided a power optimization method performed by a power optimization apparatus, comprising: performing a Maximum Power Point Tracking (MPPT) processing on a photovoltaic assembly according to an operating parameter of the photovoltaic assembly in one-to-one correspondence with the power optimization apparatus; and controlling the photovoltaic assembly according to a result of the MPPT processing to optimize a power state of the photovoltaic assembly.

In some embodiments, detecting a connection architecture of the photovoltaic assembly; and performing the MPPT processing on the photovoltaic assembly under a condition that the photovoltaic assembly adopts a series architecture.

In some embodiments, detecting whether the photovoltaic assembly has a constant voltage output requirement under a condition that the photovoltaic assembly adopts a parallel architecture; and entering a constant voltage output mode to output a constant voltage to the bus under a condition that the photovoltaic assembly has a constant voltage output requirement.

In some embodiments, performing the MPPT processing on the photovoltaic assembly under a condition that the photovoltaic assembly does not have a constant voltage output requirement.

In some embodiments, detecting whether the operating parameter of the photovoltaic assembly is less than a parameter threshold; and entering a constant voltage protection mode to control the photovoltaic assembly to output a constant voltage under a condition that the operating parameter of the photovoltaic assembly is less than a parameter threshold.

In some embodiments, detecting whether the operating parameter of the photovoltaic assembly is still less than the parameter threshold after a preset time after entering the constant voltage protection mode; and exiting the constant voltage protection mode to perform the MPPT processing on the photovoltaic assembly under a condition that the operating parameter of the photovoltaic assembly is not less than the parameter threshold.

In some embodiments, controlling the photovoltaic assembly to be shut down under a condition that the operating parameter of the photovoltaic assembly is still less than the parameter threshold.

According to a second aspect of the embodiments of the present disclosure, there is provided a power optimization apparatus comprising: an optimization processing module configured to perform a Maximum Power Point Tracking (MPPT) processing on a photovoltaic assembly according to an operating parameter of the photovoltaic assembly in one-to-one correspondence with the power optimization apparatus; and a control module configured to control the photovoltaic assembly according to a result of the MPPT processing to optimize a power state of the photovoltaic assembly.

In some embodiments, the apparatus further comprising a first detecting module configured to detect a connection architecture of the photovoltaic assembly; and the optimization processing module configured to perform the MPPT processing on the photovoltaic assembly under a condition that the photovoltaic assembly adopts a series architecture.

In some embodiments, the apparatus further comprising a second detecting module configured to detect whether the photovoltaic assembly has a constant voltage output requirement under a condition that the photovoltaic assembly adopts a parallel architecture; and the control module further configured to enter a constant voltage output mode to output a constant voltage to the bus under a condition that the photovoltaic assembly has a constant voltage output requirement.

In some embodiments, the optimization processing module is further configured to perform the MPPT processing on the photovoltaic assembly under a condition that the photovoltaic assembly does not have a constant voltage output requirement.

In some embodiments, the control module is further configured to detect whether the operating parameter of the photovoltaic assembly is less than a parameter threshold, and enter a constant voltage protection mode to control the photovoltaic assembly to output a constant voltage under a condition that the operating parameter of the photovoltaic assembly is less than a parameter threshold.

In some embodiments, the control module is further configured to detect whether the operating parameter of the photovoltaic assembly is still less than the parameter threshold after a preset time after entering the constant voltage protection mode, and exit the constant voltage protection mode to perform the MPPT processing on the photovoltaic assembly under a condition that the operating parameter of the photovoltaic assembly is not less than the parameter threshold.

In some embodiments, the control module is further configured to control the photovoltaic assembly to be shut down under a condition that the operating parameter of the photovoltaic assembly is still less than the parameter threshold.

According to a third aspect of the embodiments of the present disclosure, there is provided a power optimization apparatus comprising: a processor; and a memory coupled to the processor, storing program instructions which, when executed by the processor, cause the processor to implement the method according to any one of the embodiments described above.

According to a fourth aspect of the embodiments of the present disclosure, there is provided a photovoltaic device comprising: the power optimization apparatus according to any one of the embodiments described above, and a photovoltaic assembly in one-to-one correspondence with the power optimization apparatus.

According to a fifth aspect of the embodiments of the present disclosure, there is provided a photovoltaic system comprising a plurality of photovoltaic devices according to any one of the embodiments described above, wherein the photovoltaic devices are in a series architecture or parallel architecture.

According to a sixth aspect of the embodiments of the present disclosure, there is provided a computer readable storage medium, wherein the computer readable storage medium stores computer instructions which, when executed by a processor, implement the method according to any one of the embodiments described above.

Other features of the present disclosure and advantages thereof will become apparent from the following detailed description of exemplary embodiments thereof, which proceeds with reference to the accompanying drawings.

BRIEF DESCRIPTION OF THE DRAWINGS

In order to more clearly illustrate the embodiments of the present disclosure or the technical solutions in the prior art, the drawings used in the embodiments or the description of the prior art will be briefly described below, it is obvious that the drawings in the following description are only some embodiments of the present disclosure, and for those skilled in the art, other drawings may be obtained according to the drawings without inventive labor.

DETAILED DESCRIPTION

Figure 1:
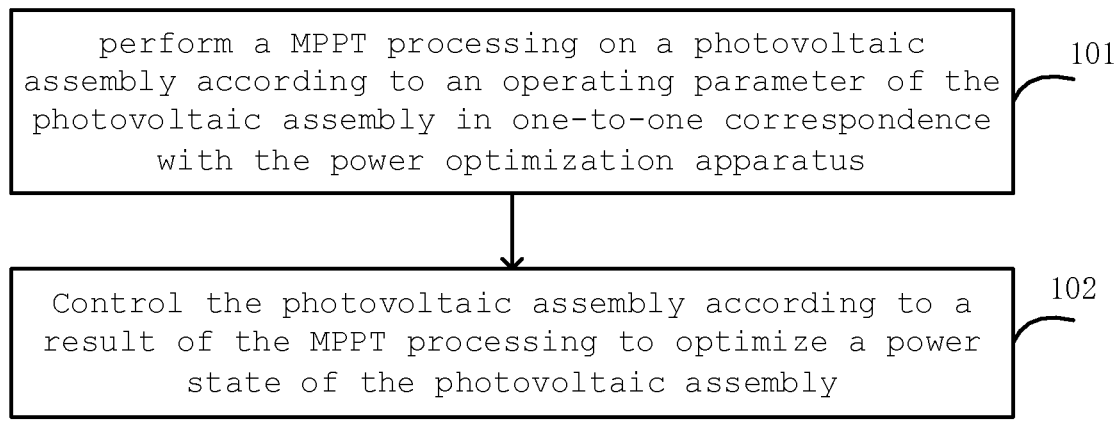
FIG. 1 is an exemplary flow diagram of a power optimization method according to one embodiment of the present disclosure.

The technical solutions in the embodiments of the present disclosure will be described clearly and completely with reference to the drawings in the embodiments of the present disclosure, and it is obvious that the embodiments described are only some, rather than all, of the embodiments of the present disclosure. The following description of at least one exemplary embodiment is merely illustrative in nature and is in no way intended to limit the disclosure, its application, or uses. All other embodiments, which can be derived by a person skilled in the art from the embodiments disclosed herein without inventive step, are intended to be within the scope of the present disclosure.

The relative arrangement of parts and steps, numerical expressions and numerical values set forth in these embodiments do not limit the scope of the present disclosure unless specifically stated otherwise.

Meanwhile, it should be understood that the sizes of the respective portions shown in the drawings are not drawn in an actual proportional relationship for the convenience of description.

Techniques, methods, and apparatus known to one of ordinary skill in the relevant art may not be discussed in detail but are intended to be part of the specification where appropriate.

In all examples shown and discussed herein, any particular value should be construed as exemplary only and not as limiting. Thus, other examples of the exemplary embodiments may have different values.

It should be noted that: similar reference numbers and letters refer to similar items in the following figures, and thus, once an item is defined in one figure, it need not be discussed further in subsequent figures.

FIG. 1 is an exemplary flow diagram of a power optimization method according to one embodiment of the present disclosure. In some embodiments, the power optimization method is performed by a power optimization apparatus, and the power optimization apparatus is in one-to-one correspondence with the photovoltaic assembly.

In step 101, a MPPT processing is performed on a photovoltaic assembly according to an operating parameter of the photovoltaic assembly in one-to-one correspondence with the power optimization apparatus.

Since the MPPT processing itself is not the inventive point of the present disclosure, a description thereof will not be made here.

In step 102, the photovoltaic assembly is controlled according to a result of the MPPT processing to optimize a power state of the photovoltaic assembly.

In the power optimization method provided by the above embodiment of the present disclosure, one power optimization apparatus is provided for each photovoltaic assembly, and the MPPT processing is performed by the power optimization apparatus on the corresponding photovoltaic assembly, so that a power mismatch can be effectively avoided. In addition, the connection architecture of the photovoltaic assembly is not limited by the method, and the power optimization of the photovoltaic assembly can be realized under a condition that the photovoltaic assembly adopts a series architecture or a parallel architecture.

Figure 2:
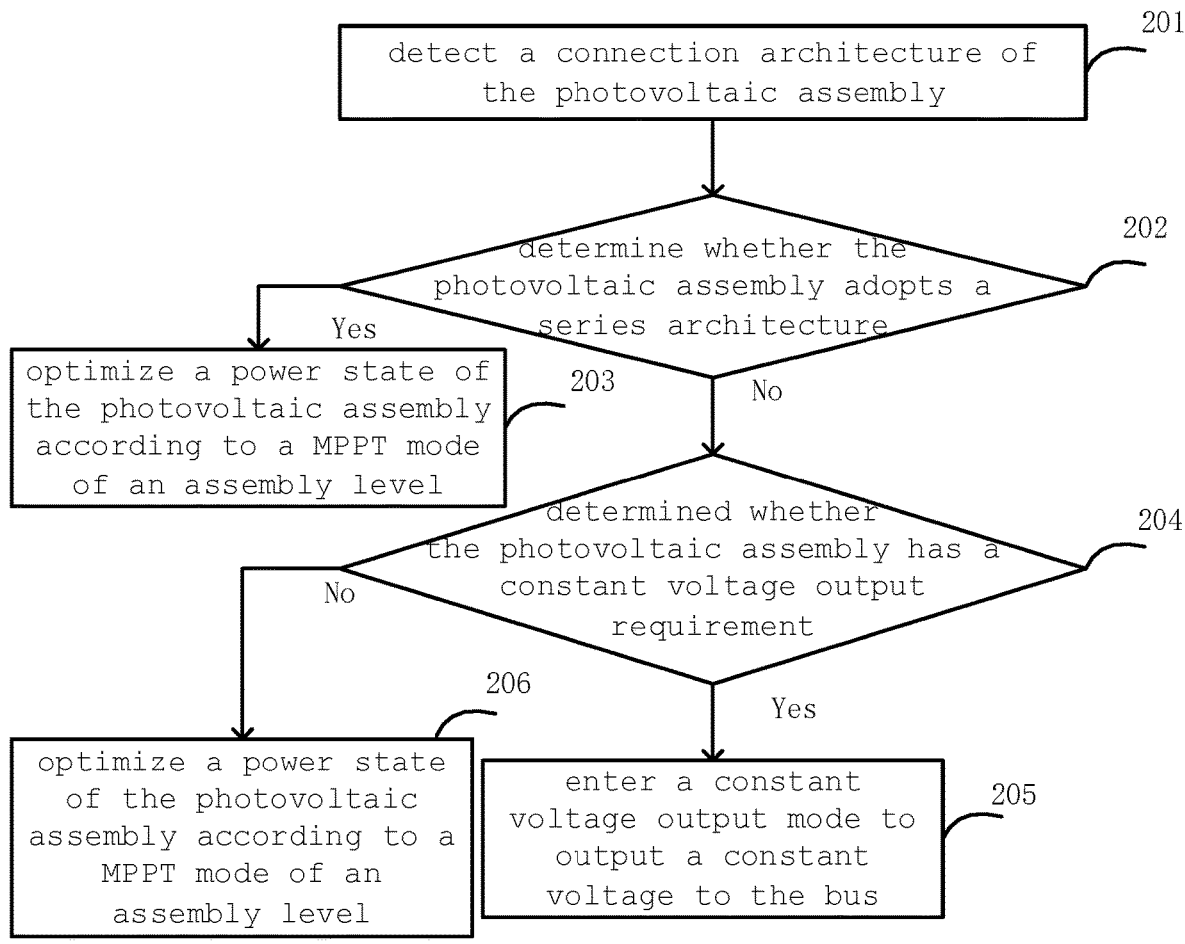
FIG. 2 is an exemplary flow chart of a power optimization method of another embodiment of the present disclosure.

FIG. 2 is an exemplary flow chart of a power optimization method of another embodiment of the present disclosure. In some embodiments, the power optimization method may be performed by a power optimization apparatus, and the power optimization apparatus is in one-to-one correspondence with the photovoltaic assembly.

In step 201, a connection architecture of the photovoltaic assembly is detected.

In step 202, it is determined whether the photovoltaic assembly adopts a series architecture according to a detecting result.

In a case that the photovoltaic assembly adopts a series architecture, step 203 is executed. In a case that the photovoltaic assembly adopts a parallel architecture, step 204 is executed.

In step 203, a power state of the photovoltaic assembly is optimized according to a MPPT mode of an assembly level.

In some embodiments, the embodiment shown in FIG. 1 may be employed to optimize the power state of the photovoltaic assembly.

At step 204, it is determined whether the photovoltaic assembly has a constant voltage output requirement.

Under a condition that the photovoltaic assembly has a constant voltage output requirement, step 205 is executed. Under a condition that the photovoltaic assembly does not have the constant voltage output requirement, step 206 is executed.

In step 205, a constant voltage output mode is entered to output a constant voltage to the bus.

For example, if the photovoltaic assembly has a constant voltage output requirement, it is first determined whether there is a constant voltage requirement at a preset voltage (e.g., 48V). If there is a 48V constant voltage requirement, then 48V output constant voltage mode is entered. If there isn't a 48V constant voltage requirement, a constant voltage mode for outputting the preset voltage is entered.

At step 206, the power state of the photovoltaic assembly is optimized according to the MPPT mode of an assembly level.

In some embodiments, the embodiment shown in FIG. 1 may be employed to optimize the power state of the photovoltaic assembly.

In the above embodiment, the MPPT algorithm is adopted to perform corresponding power optimization no matter the photovoltaic assembly adopts a series architecture or a parallel architecture.

In some embodiments, during power optimization according to the MPPT mode of an assembly level, it is detected whether an operating parameter of the photovoltaic assembly is less than a parameter threshold. If the operating parameter of the photovoltaic assembly is less than the parameter threshold, it means that the output power of the photovoltaic assembly is obviously attenuated. A constant voltage protection mode is entered under this condition, and the photovoltaic assembly is controlled to output a constant voltage to protect the system. A preset time is delayed and the operating parameter of the photovoltaic assembly is detected whether still less than the parameter threshold. If the operating parameter of the photovoltaic assembly is not less than the parameter threshold, it means that the photovoltaic device does not have a fault, possibly the collected operating parameter has a deviation. In this case, the constant voltage protection mode is exited to continuously perform MPPT processing on the photovoltaic assembly. If the operating parameter of the photovoltaic assembly is still less than the parameter threshold, it means that the photovoltaic device has a fault at the moment, therefore the photovoltaic assembly is controlled to be shut down.

In some embodiments, the operating parameter of the photovoltaic assembly includes a voltage value or a current value of the photovoltaic assembly. Accordingly, the parameter threshold is also a corresponding voltage value or current value.

Figure 3:
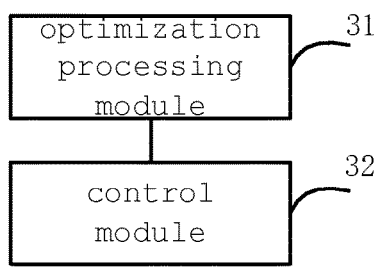
FIG. 3 is an exemplary block diagram of a power optimization apparatus of one embodiment of the present disclosure.

FIG. 3 is an exemplary block diagram of a power optimization apparatus of one embodiment of the present disclosure. As shown in FIG. 3, the power optimization apparatus includes an optimization processing module 31 and a control module 32.

The optimization processing module 31 is configured to perform MPPT processing on the photovoltaic assembly according to the operating parameter of the photovoltaic assembly in one-to-one correspondence with the power optimization apparatus.

The control module 32 is configured to control the photovoltaic assembly according to a result of the MPPT processing to optimize a power state of the photovoltaic assembly.

In the power optimization apparatus provided in the above embodiment of the present disclosure, the power optimization apparatus performs MPPT processing on the corresponding photovoltaic assembly, wherein one power optimization apparatus is provided for each photovoltaic assembly, so that a power mismatch can be effectively avoided. In addition, the connection architecture of the photovoltaic assembly is not limited by the method, and the power optimization of the photovoltaic assembly can be realized under a condition that the photovoltaic assembly adopts a series architecture or a parallel architecture.

Figure 4:
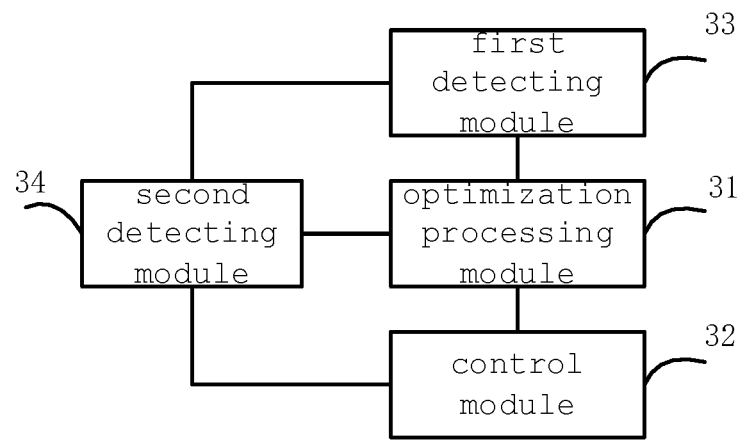
FIG. 4 is an exemplary block diagram of a power optimization apparatus of another embodiment of the present disclosure.

FIG. 4 is an exemplary block diagram of a power optimization apparatus of another embodiment of the present disclosure. FIG. 4 differs from FIG. 3 in that in the embodiment shown in FIG. 4, the power optimization apparatus further comprises a first detecting module 33 and a second detecting module 34.

The first detecting module 33 is configured to identify the connection architecture of the photovoltaic assembly.

The optimization processing module 31 is configured to perform the MPPT processing on the photovoltaic assembly under a condition that the photovoltaic assembly adopts a series architecture.

The second detecting module 34 is configured to further identify whether the photovoltaic assembly has a constant voltage output requirement under a condition that the photovoltaic assembly adopts a parallel architecture.

The control module 32 is further configured to enter a constant voltage output mode to output a constant voltage to the bus under a condition that the photovoltaic assembly has a constant voltage output requirement.

In some embodiments, the optimization processing module 31 is further configured to perform MPPT processing on the photovoltaic assembly under a condition that the photovoltaic assembly does not have a constant voltage output requirement.

In the above embodiment, the MPPT algorithm may be adopted to perform corresponding power optimization no matter the photovoltaic assembly adopts a series architecture or a parallel architecture, In some embodiments, the control module 32 is further configured to detect whether the operating parameter of the photovoltaic assembly is less than a parameter threshold, and to enter a constant voltage protection mode under a condition that the operating parameter of the photovoltaic assembly is less than the parameter threshold, so as to control the photovoltaic assembly to output a constant voltage. The operating parameter of the photovoltaic assembly is less than the parameter threshold, which indicates that the output power of the photovoltaic assembly has obvious power attenuation. Under this condition, a constant voltage protection mode is entered, and the photovoltaic assembly is controlled to output a constant voltage so as to protect the system.

In some embodiments, the control module 32 is further configured to detect whether the operating parameter of the photovoltaic assembly is still less than a parameter threshold after a preset time after entering the constant voltage protection mode, and exit the constant voltage protection mode under a condition that the operating parameter of the photovoltaic assembly is not less than the parameter threshold, so as to perform the MPPT processing on the photovoltaic assembly. The control module 32 is further configured to control the photovoltaic assembly to be shut down under a condition that the operating parameter of the photovoltaic assembly is still less than the parameter threshold. If the operating parameter of the photovoltaic assembly is not less than the parameter threshold, it means that the photovoltaic device does not have a fault, possibly the collected operating parameter has a deviation. In this case, the constant voltage protection mode is exited to continuously perform MPPT processing on the photovoltaic assembly. If the operating parameter of the photovoltaic assembly is still less than the parameter threshold, it means that the photovoltaic device has a fault at the moment, therefore the photovoltaic assembly is controlled to be shut down.

Figure 5:
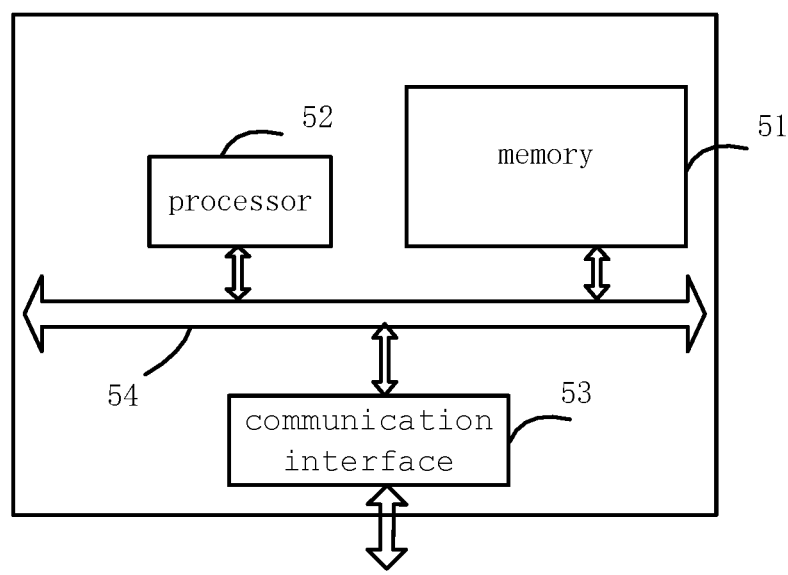
FIG. 5 is an exemplary block diagram of a power optimization apparatus of still another embodiment of the present disclosure.

FIG. 5 is an exemplary block diagram of a power optimization apparatus of still another embodiment of the present disclosure. As shown in FIG. 5, the power optimization apparatus includes a memory 51 and a processor 52.

The memory 51 is used for storing instructions, and the processor 52 is coupled to the memory 51. The processor 52 is configured to execute the method according to any one of the embodiments in FIG. 1 or FIG. 2 based on the instructions stored in the memory.

As shown in FIG. 5, the power optimization apparatus further includes a communication interface 53 for information interaction with other devices. Meanwhile, the power optimization apparatus also comprises a bus 54, and the processor 52, the communication interface 53 and the memory 51 are communicated with each other through the bus 54.

The memory 51 may comprise high-speed RAM memory, and may also include non-volatile memory (non-volatile memory), such as at least one disk memory. The memory 51 may also be a memory array. The storage 51 may also be partitioned and the blocks may be combined into virtual volumes according to certain rules.

Further, the processor 52 may be a central processing unit CPU, or may be an application specific integrated circuit ASIC, or one or more integrated circuits configured to implement embodiments of the present disclosure.

The present disclosure also relates to a computer-readable storage medium, wherein the computer-readable storage medium stores computer instructions, and the instructions, when executed by a processor, implement the method according to any one of the embodiments in FIG. 1 or FIG. 2.

Figure 6:
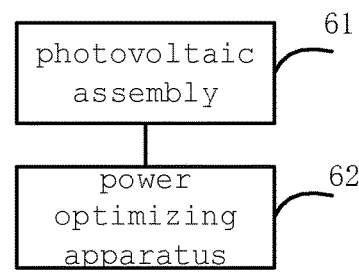
FIG. 6 is an exemplary block diagram of a photovoltaic device of an embodiment of the present disclosure.

FIG. 6 is an exemplary block diagram of a photovoltaic device of one embodiment of the present disclosure.

As shown in FIG. 6, the photovoltaic device includes a photovoltaic assembly 61 and a power optimizing apparatus 62. The power optimization apparatus 62 is the power optimization apparatus according to any one of the embodiments in FIG. 3 to FIG. 5. The power optimization device is configured for the photovoltaic assembly to optimize the power state of the photovoltaic assembly.

The present disclosure also provides a photovoltaic system comprising a plurality of photovoltaic devices as shown in FIG. 6. Each photovoltaic device adopts a series architecture or a parallel architecture.

In some embodiments, a plurality of photovoltaic devices included in a photovoltaic system adopts a series architecture, i.e., the photovoltaic devices are connected in series.

In other embodiments, a plurality of photovoltaic devices comprised in the photovoltaic system adopts a parallel architecture, i.e. the photovoltaic devices are connected in parallel.

In still other embodiments, the plurality of photovoltaic devices included in the photovoltaic system are divided into two parts, with the photovoltaic devices in the first part being connected in series and the photovoltaic devices in the second part being connected in parallel, i.e., in a series plus parallel topology.

Figure 7:
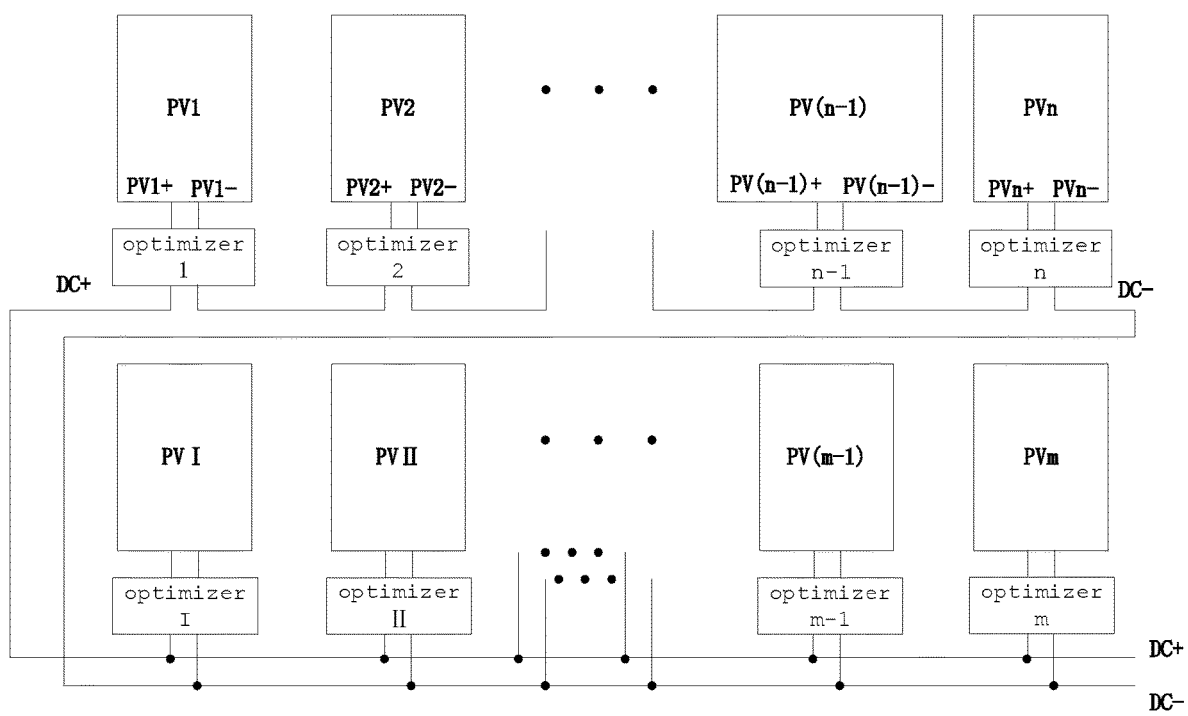
FIG. 7 is an exemplary block diagram of a photovoltaic system of one embodiment of the present disclosure.

FIG. 7 is an exemplary block diagram of a photovoltaic system of one embodiment of the present disclosure. As shown in FIG. 7, each photovoltaic assembly is provided with an optimizer, which is a power optimization device according to any one of the embodiments in FIG. 3 to 5. The series subsystem is formed by connecting the photovoltaic assemblies PV1, PV2, . . . and PVn in series, and the parallel subsystem is formed by connecting the photovoltaic assemblies PVI, PVII, . . . and PVm in parallel. The m+n photovoltaic assemblies shown in the FIG. 7 form a photovoltaic assembly string system in a serial connection and parallel connection mode. The direct current buses on the output sides of the power optimizers installed at the photovoltaic assemblies can be independently supplied to direct current loads after being connected in parallel, and can also be connected to a photovoltaic DC device, an inverter or a direct current bus of an energy storage inverter system.

By implementing the scheme, the defects caused by mismatch of a conventional photovoltaic power generation system can be overcome according to actual requirements, the topological structure and the operating mode of the conventional photovoltaic power generation system can be expanded through the design mode of the free series-parallel component architecture. The functional expandability and the optimal perfection of the performance of the system can be ensured.

In some embodiments, the functional unit modules described above can be implemented as a general purpose Processor, a Programmable Logic Controller (PLC), a Digital Signal Processor (Digital Signal Processor, DSP), an Application Specific Integrated Circuit (ASIC), a Field Programmable Gate Array (FPGA) or other Programmable Logic device, discrete Gate or transistor Logic, discrete hardware components, or any suitable combination thereof for performing the functions described in this disclosure.

It will be understood by those skilled in the art that all or part of the steps for implementing the above embodiments may be implemented by hardware, or may be implemented by a program instructing relevant hardware, where the program may be stored in a computer-readable storage medium, and the storage medium may be a read-only memory, a magnetic disk or an optical disk. The description of the present disclosure has been presented for purposes of illustration and description, and is not intended to be exhaustive or limited to the disclosure in the form disclosed. Many modifications and variations will be apparent to practitioners skilled in this art. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A power optimization method, performed by a power optimization apparatus, comprising:
   performing a Maximum Power Point Tracking (MPPT) processing on a photovoltaic assembly according to an operating parameter of the photovoltaic assembly in one-to-one correspondence with the power optimization apparatus; and
   controlling the photovoltaic assembly according to a result of the MPPT processing to optimize a power state of the photovoltaic assembly.

2. The power optimization method according to claim 1, further comprising:
   detecting a connection architecture of the photovoltaic assembly; and
   performing the MPPT processing on the photovoltaic assembly under a condition that the photovoltaic assembly adopts a series architecture.

3. The power optimization method according to claim 2, further comprising:
   detecting whether the photovoltaic assembly has a constant voltage output requirement under a condition that the photovoltaic assembly adopts a parallel architecture; and
   entering a constant voltage output mode to output a constant voltage to a bus under a condition that the photovoltaic assembly has a constant voltage output requirement.

4. The power optimization method according to claim 3, further comprising:
   performing the MPPT processing on the photovoltaic assembly under a condition that the photovoltaic assembly does not have a constant voltage output requirement.

5. The power optimization method according to claim 1, further comprising:
   detecting whether the operating parameter of the photovoltaic assembly is less than a parameter threshold; and
   entering a constant voltage protection mode to control the photovoltaic assembly to output a constant voltage under a condition that the operating parameter of the photovoltaic assembly is less than the parameter threshold.

6. The power optimization method according to claim 5, further comprising:
   detecting whether the operating parameter of the photovoltaic assembly is still less than the parameter threshold after a preset time after entering the constant voltage protection mode; and
   exiting the constant voltage protection mode to perform the MPPT processing on the photovoltaic assembly under a condition that the operating parameter of the photovoltaic assembly is not less than the parameter threshold.

7. The power optimization method according to claim 6, further comprising:
   controlling the photovoltaic assembly to be shut down under a condition that the operating parameter of the photovoltaic assembly is still less than the parameter threshold.

8. A power optimization apparatus, comprising:
   an optimization processing module configured to perform a Maximum Power Point Tracking (MPPT) processing on a photovoltaic assembly according to an operating parameter of the photovoltaic assembly in one-to-one correspondence with the power optimization apparatus; and
   a control module configured to control the photovoltaic assembly according to a result of the MPPT processing to optimize a power state of the photovoltaic assembly.

9. The power optimization apparatus according to claim 8, further comprising a first detecting module configured to detect a connection architecture of the photovoltaic assembly; and
   the optimization processing module is configured to perform the MPPT processing on the photovoltaic assembly under a condition that the photovoltaic assembly adopts a series architecture.

10. The power optimization apparatus according to claim 9, further comprising a second detecting module configured to detect whether the photovoltaic assembly has a constant voltage output requirement under a condition that the photovoltaic assembly adopts a parallel architecture; and
    the control module is further configured to enter a constant voltage output mode to output a constant voltage to a bus under a condition that the photovoltaic assembly has a constant voltage output requirement.

11. The power optimizing apparatus according to claim 10, wherein the optimization processing module is further configured to perform the MPPT processing on the photovoltaic assembly under a condition that the photovoltaic assembly does not have a constant voltage output requirement.

12. The power optimizing apparatus according to claim 8, wherein
    the control module is further configured to detect whether the operating parameter of the photovoltaic assembly is less than a parameter threshold, and enter a constant voltage protection mode to control the photovoltaic assembly to output a constant voltage under a condition that the operating parameter of the photovoltaic assembly is less than the parameter threshold.

13. The power optimizing apparatus according to claim 12, wherein
the control module is further configured to detecting whether the operating parameter of the photovoltaic assembly is still less than the parameter threshold after a preset time after entering the constant voltage protection mode, and exit the constant voltage protection mode to perform the MPPT processing on the photovoltaic assembly under a condition that the operating parameter of the photovoltaic assembly is not less than the parameter threshold.

14. The power optimizing apparatus according to claim 13, wherein
the control module is further configured to control the photovoltaic assembly to be shut down under a condition that the operating parameter of the photovoltaic assembly is still less than the parameter threshold.

15. A power optimization apparatus, comprising:
a processor; and
a memory coupled to the processor, storing program instructions which, when executed by the processor, cause the processor to implement to:
performing a Maximum Power Point Tracking (MPPT) processing on a photovoltaic assembly according to an operating parameter of the photovoltaic assembly in one-to-one correspondence with the power optimization apparatus; and
controlling the photovoltaic assembly according to a result of the MPPT processing to optimize a power state of the photovoltaic assembly.

16. A photovoltaic device, comprising:
the power optimization apparatus of claim 15, and
a photovoltaic assembly in one-to-one correspondence with the power optimization apparatus.

17. A photovoltaic system, comprising a plurality of photovoltaic devices according to claim 16, wherein the photovoltaic devices are in a series architecture or parallel architecture.

18. A non-transitory computer readable storage medium, wherein the computer readable storage medium stores computer instructions which, when executed by a processor, implements the method of claim 1.

* * * * *